Figure 7:
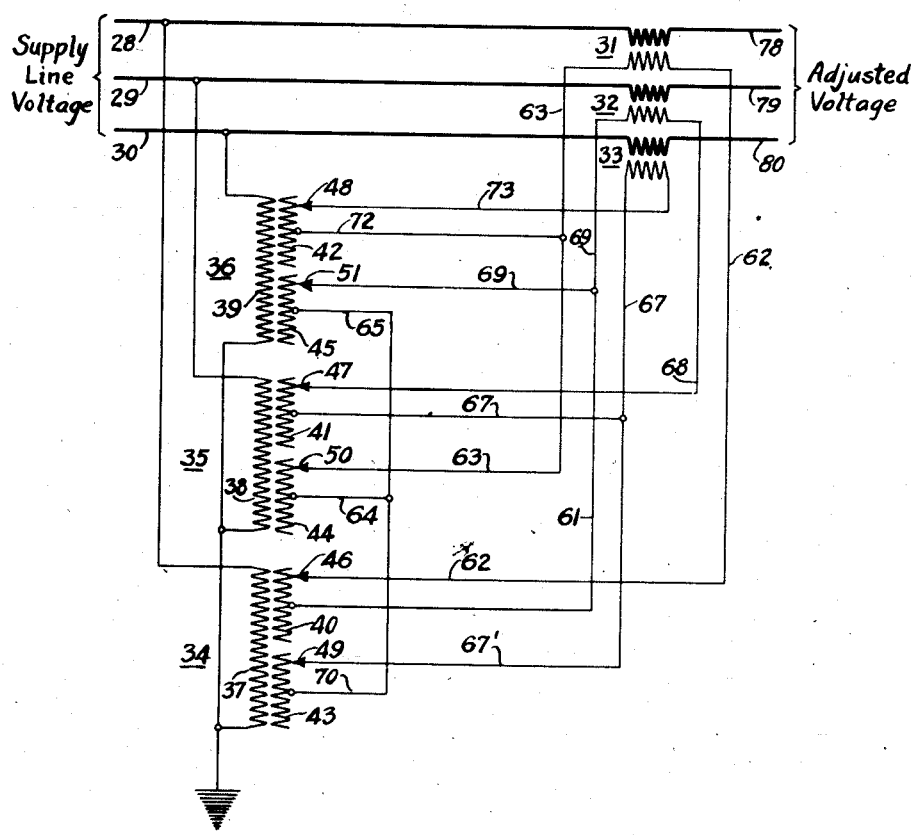

Aug. 23, 1932.         J. T. MERCEREAU ET AL         1,873,777
TAP CHANGING SYSTEM
Filed Jan. 17, 1931         3 Sheets-Sheet 1
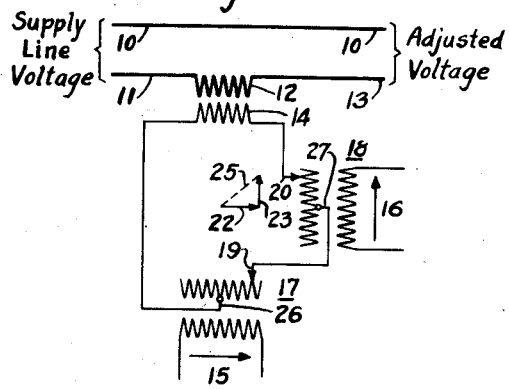
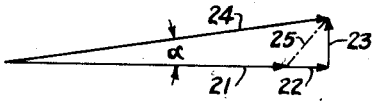
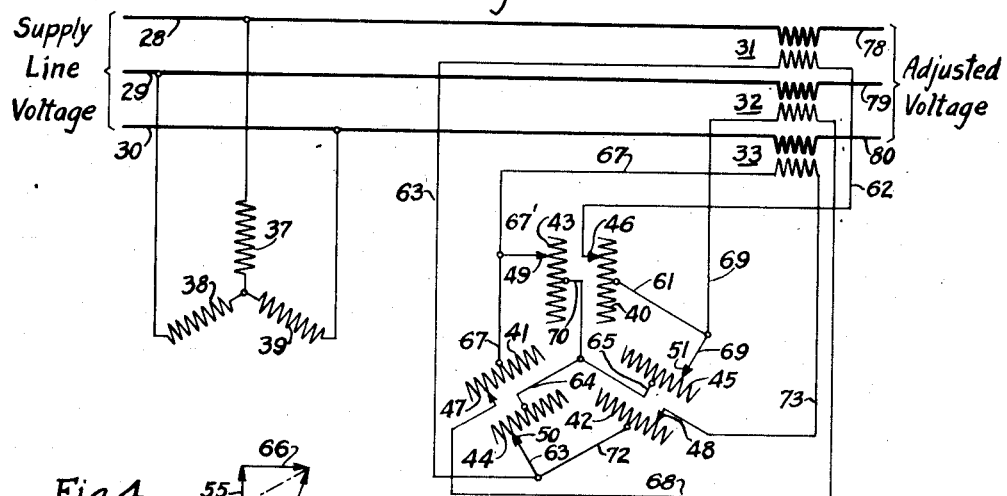
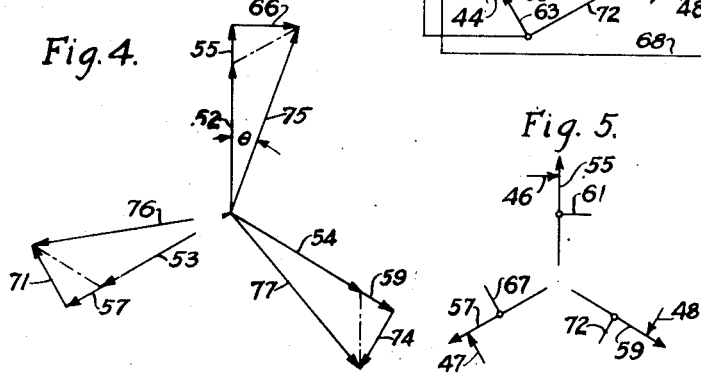
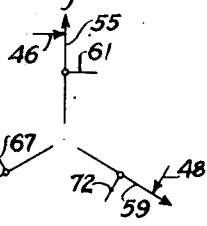
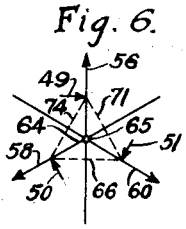
WITNESSES:
INVENTORS
James T. Mercereau, and
Horace L. Cole
BY
ATTORNEY INVENTORS
James T. Mercereau, and
Horace L. Cole Aug. 23, 1932.   J. T. MERCEREAU ET AL   1,873,777
TAP CHANGING SYSTEM
Filed Jan. 17, 1931   3 Sheets-Sheet 3
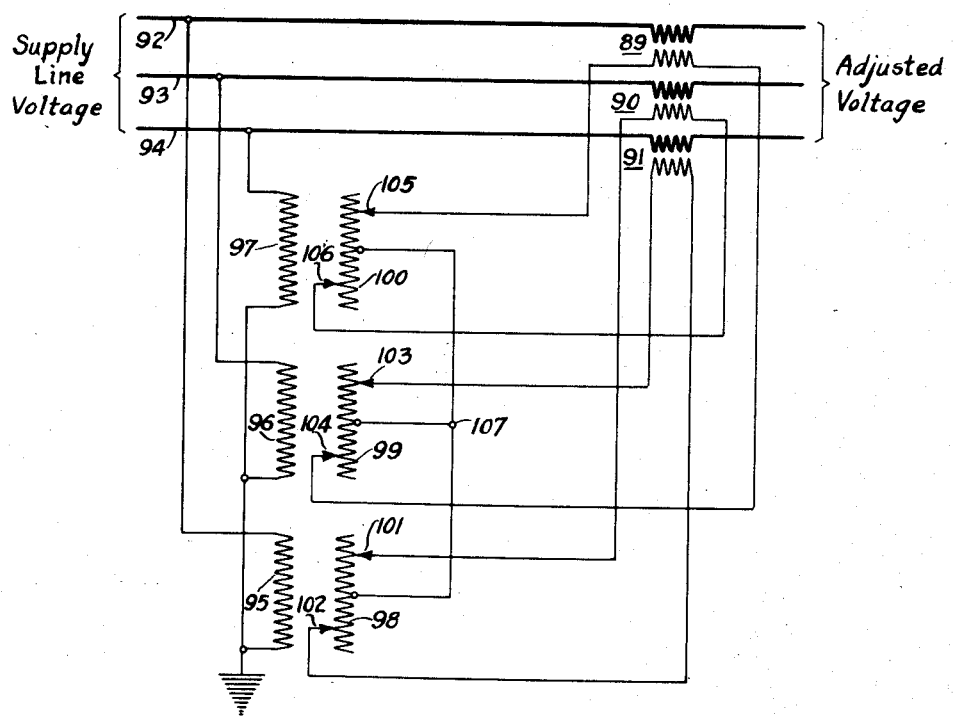
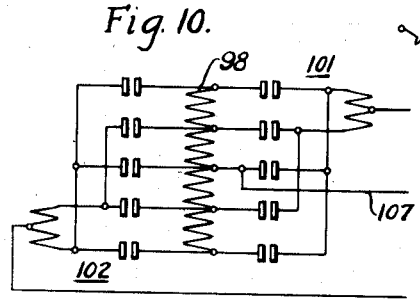
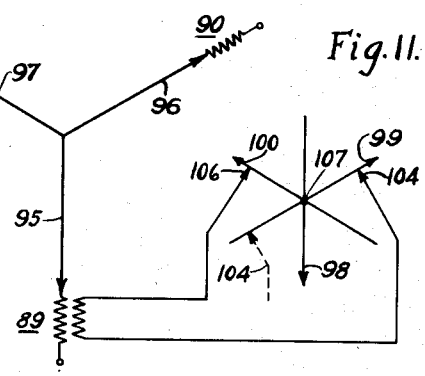
WITNESSES:
INVENTORS
James T. Mercereau, and
Horace L. Cole
BY
ATTORNEY Patented Aug. 23, 1932

1,873,777

UNITED STATES PATENT OFFICE

JAMES T. MERCEREAU AND HORACE LEE COLE, OF SHARON, PENNSYLVANIA, ASSIGNORS TO WESTINGHOUSE ELECTRIC AND MANUFACTURING COMPANY, A CORPORATION OF PENNSYLVANIA

TAP CHANGING SYSTEM

Application filed January 17, 1931. Serial No. 509,350.

Our invention relates to tap-changing apparatus and has particular relation to transformer systems for varying both the magnitude and phase-angle relation between voltages in alternating-current power circuits without removing the load therefrom.

It frequently occurs, when it is desired to interconnect two power lines, that there is a phase-angle difference between the voltages of the two systems, as well as a slight difference in the voltage magnitudes at the desired point of connection between them, and, for this reason, it is necessary to provide means for bringing the phase position and the magnitude of the two voltages together in order that the one system may be properly matched with the other.

Likewise, there are many cases in which it is desired to control the power flow between two such interconnected lines. As is well known in the art, the difference in the phase-angle position of the respective line voltages determines and controls the actual power transfer, while the difference in magnitudes of the same two respective voltages similarly regulates the flow of wattless power between the two lines.

The use of series transformers in the line conductors of power circuits to introduce therein components of voltage is recognized as being a highly satisfactory manner of controlling electrical systems of the type under consideration. Heretofore, however, it has been necessary to provide one set of series transformers for adding "in phase" components of voltage, and a separate set of series transformers for adding "out of phase" components, because of inherent limitations which previously developed systems have possessed.

We have discovered that, by combining and interconnecting the elements of our regulating system in a novel manner, one series transformer per line may be made to perform the functions which have formerly required the use of the two units for introducing, respectively, the magnitude and phase-shifting components of the regulating voltage into the power circuit. By thus dispensing with one of the series transformers per line, and because of other inherent merits of our system, we are enabled to effect marked advantages and distinct savings in carrying our invention into practice.

It is, accordingly, an object of our invention to reduce the cost of the equipment used in combined voltage magnitude and phase-angle regulating systems by providing an improved method of connecting and combining the elements employed.

It is another object of our invention to reduce the weight of, and the space required by, regulating equipments of this type.

A still further object of our invention is to increase the efficiency of voltage magnitude and phase-angle-regulating equipments by reducing the losses which occur therein.

Our invention will best be understood from the following detailed description, taken in conjunction with the accompanying drawings, in which Figure 1 is a diagrammatic view of a single-phase power circuit which illustrates the basic principle upon which we found our invention.

Figure 8:
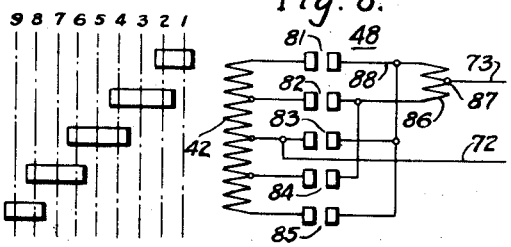

Fig. 2 is a vector diagram representing the voltages in the circuit of Fig. 1,

Fig. 3 is a diagrammatic view of apparatus and circuits arranged in accordance with our invention and applied to a three-phase power circuit, the regulating transformer windings being represented in accordance with the vector relations of the several voltages acting in them, Figs. 4, 5 and 6 are vector diagrams representing the directions and magnitudes of the voltages in the system of Fig. 3, Fig. 7 is a diagrammatic view of the system of Fig. 3, in which the transformer windings are shown in accordance with their respective inductive relations, Fig. 8 is a diagrammatic view showing the connections of the tap-changing under load mechanism which is associated with each of the two secondary windings of the regulating transformers in the system of Figs. 3 to 7, inclusive, and illustrates the controller development which determines the sequence of operation of the several switches there used, Fig. 9 is a diagrammatic view showing a modified form suitable for a regulating application in which the voltage-magnitude component of the regulation available bears a given and inter-related ratio to the phase-shifting component, Fig. 10 is a diagrammatic view showing the connections of the two tap-changing under load mechanisms which are associated with each of the secondary windings of the regulating transformers shown in Fig. 9, and Fig. 11 is a vector diagram representing the application of voltages to one phase of the system of Fig. 9.

Referring to the drawings, particularly Fig. 1, lines 10 and 11 represent the conductors of a single-phase alternating-current power-circuit supply to which the basic principle of our invention is applied. The secondary winding 12 of a series transformer is connected between the line conductor 11 and the line conductor 13 for the purpose of introducing an adjustable voltage into the circuit to control the voltage difference between the circuit conductors 10 and 11 and 10 and 13. The primary winding 14 of the series transformer is energized by two suitable sources of voltage 15 and 16 connected in series-circuit relation, such as the two transformers 17 and 18.

One winding of each of transformers 17 and 18 is provided with suitable tap connections arranged to be varied by connecting the leads 19 and 20 to different points along the windings with which they are respectively associated. It will be seen that the series transformer winding 14 will be energized by the sum of the voltages supplied from sources 15 and 16.

Referring to Fig. 2, the horizontally drawn vector 21 represents the magnitude and phase position, at some given instant, of the power-supply voltage between conductors 10 and 11 of the single-phase power circuit. The voltage of one of the variable sources, source 15 in this instance, is chosen to have a phase position similar to that of the power supply, as indicated by the horizontal arrow or vector at 15, and the voltage of the source 16 is chosen to have an out-of-phase position therewith, the relation being preferably one of substantial quadrature or 90° angular displacement, as indicated by the vector at 16.

It will be evident that the source 15 acts to directly change the magnitude of the power-circuit voltage, in the specific connection shown by an amount represented by a vector, such as 22. Likewise, the source 16 acts to shift the phase position of the voltage in the power circuit, and, in the specific connection shown, this phase-shifting component may be represented by the vector 23 in quadrature relation to the vectors 21 and 22. The regulating voltage impressed upon winding 14 of the series transformer is the vector sum of components 22 and 23, and may be represented by the intermediate vector 25.

The values of the two components are suitably arranged for independent adjustment, as by varying the tap connections 19 and 20 to any desired position along the windings of transformers 17 and 18. It will be evident that, by such means, in combination with the mid-tap connections 26 and 27 to the regulating windings, the two components may be varied through values ranging from zero to some given value, in both positive and negative directions, and, since they may be controlled independently, it will be apparent that practically any desired combination is possible.

It will be appreciated that the system of Fig. 1, just described, is intended to be illustrative of the principle upon which we base our invention, that of applying both the voltage-magnitude and phase-shifting components of regulating voltage to a single series transformer in the line of the power circuit to be regulated.

In applying our invention to polyphase power circuits, we have found that no separate source of regulating voltage is needed. Thus, in Figs. 3 and 7, a three-phase power circuit is represented by line conductors 28, 29 and 30, and transformers 31, 32 and 33, respectively, are connected in series circuit therewith for the purpose of introducing voltages into the circuit.

To supply these voltages, three regulating transformers, or their equivalent, are provided. As illustrated in Fig. 7 at 34, 35 and 36, each transformer comprises three inductively related windings. The primary windings of these units, or windings 37, 38 and 39, respectively, are interconnected in some suitable manner, as in the star-relation arrangement shown, for energization from the main power circuit. The secondary windings of the several units, designated by 40, 41 and 42, respectively, are for the purpose of supplying the in-phase or voltage magnitude components to the series transformers, while the secondary windings designated by 43, 44 and 45, respectively, serve to supply the out-of-phase or phase-position shifting components of the voltage.

As can be seen most readily from Fig. 3 in which the windings of the regulating transformers 34, 35 and 36 are shown in accordance with the vector relations of the voltages acting in them, each series transformer in the power-circuit line is thus energized from one winding of the regulating transformers, which supplies a voltage substantially in phase with the power voltage acting on the given line, and by portions of the windings of each of the remaining two phases, which are so combined that they supply a voltage substantially in quadrature therewith.

Suitable tap-changing apparatus, designed for operation without removal of load, and indicated by the arrow connections 46, 47 and 48, is provided for changing the size and direction of the respective "in-phase" components. Similar apparatus, indicated by the arrow connections 49, 50 and 51, functions to vary the size and direction of the quadrature or voltage-shifting components of the added voltage. Connections to the mid-points of these second and third groups of windings make possible a range of voltage-component values from some positive value, progressively, through zero, to a similar value having 180 degrees phase displacement, specific values within this range being selectable by an operator.

In the vector diagram of Fig. 4, we have represented by vectors 52, 53 and 54, the power-line voltages which act to energize the star-connected exciting windings 37, 38 and 39, respectively. It will be apparent that the voltages induced in windings 40 and 43 are substantially in phase with the voltage acting in winding 37 with which windings 40 and 43 are inductively related, represented by vector 52, hence, these voltages may be represented by vectors, parallel to vector 52, such as 55 and 56, respectively, shown in Figs. 5 and 6. Likewise, the voltages of windings 41 and 44 are in phase with the voltage vector 53 and may be represented, respectively, by vectors 57 and 58, parallel thereto. In like manner, the voltages of windings 42 and 45 may be respectively represented by vectors 59 and 60, drawn parallel to vector 54.

An examination of the circuits of Figs. 3 and 7 will show that the series transformer 31, in power circuit line 28, for example, will be energized by a circuit extending from mid-tap 61 of the winding 40, through a portion of winding 40, shiftable tap-connection 46, wire 62, primary winding of series transformer 31, wire 63, shiftable tap-connection 50 of winding 44, a portion of winding 44, mid-tap connection 64 of this winding, mid-tap connections 65 of winding 45, a portion of winding 45 and shiftable tap-connection 51, back to mid-tap connection 61 of the winding 40.

Referring to the vector diagrams of Figs. 5 and 6, it will be seen that the in-phase component of the voltage impressed upon series transformer 31 is that portion of vector 55 included between connections 46 and 61, there shown, while the quadrature or phase-shifting component comprises, in combination, a portion of vector 58 included between connection 50 and the mid-point 64, combined with a portion of vector 60 included between its mid-point 65 and the connection 51. These two vector sections last named give the equivalent of a single voltage vector represented by the dotted line 66 of Fig. 6.

In a similar manner, series transformer 32, in power circuit line 29, is energized by a circuit extending from mid-tap connection 67 of winding 41, through a portion of winding 41, shiftable tap connection 47, wire 68, primary winding of series transformer 32, wire 69, shiftable tap-connection 51 of winding 45, a portion of winding 45, mid-tap connection 65, mid-tap connection 70 of winding 43, a portion of winding 43 and shiftable tap connection 49, back to mid-tap connection 67 of winding 41.

Referring again to the vector diagrams, it will be evident that series transformer 32 is thus energized by an in-phase component of voltage represented by that portion of vector 57 included between connections 67 and 47, and by a quadrature or phase-shifting component 71 formed by sections of vectors 56 and 60.

Considering the series transformer 33, in line 30 of the power circuit, it will be seen that its energizing circuit extends from mid-tap connection 72 of winding 42, through a portion of winding 42, shiftable tap connection 48, wire 73, primary winding of series transformer 33, wire 67, wire 67', shiftable tap connection 49 of winding 43, a portion of winding 43, mid-tap connection 70, mid-tap connection 64 of winding 44, a portion of winding 44, shiftable tap connection 50 and wire 63, back to mid-tap 72 of the winding 42. The in-phase component of voltage, which thus energizes series transformers 33, is represented in Fig. 5 by that portion of the vector 59 included between connections 72 and 48, and the quadrature component is designated in Fig. 6 by vector 72, comprising sections of vectors 58 and 56.

Assuming, as in the case of Fig. 1, that the series transformers in the power-circuit lines transfer the impressed voltages into the power circuit without substantial change, then these regulating components may be superimposed vectorially upon the supply-line voltages, which, as we have seen, are represented by the vectors 52, 53 and 54, respectively, in Fig. 4. Considering, on this basis, first the voltage adjustment afforded by series transformer 31, the in-phase component may be represented by the vector 55 of Fig. 5 added directly to power-voltage vector 52 in Fig. 3, and the quadrature component vector 66 of Fig. 6 may be combined with Fig. 4 in the manner there indicated at 66. Similarly, series transformer 32 introduces into power line 29, the in-phase component 57, which directly adds to power-voltage vector 53 and the quadrature phase component 71 which combines therewith, as shown. Likewise, series transformer 33 introduces into the line 30 the in-phase component 59 and the quadrature-phase component 74, which add to power-voltage vector 54.

Thus, the equivalent "star" voltage has been changed by these components from that represented by vectors 52, 53 and 54, for conductors 28, 29 and 30 of the power circuit to that represented by the vectors 75, 76 and 77 which are effective in the regulated side of the power circuit or conductors 78, 79 and 80. In the specific instance assumed, the magnitudes of these voltages have been, as is seen, uniformly increased, and the phase position has been shifted by a uniform angle denoted by theta.

The tap-changing apparatus or shiftable tap connections, designated in Figs. 3 and 7 by the arrow connections in contact with the transformer windings, represent tap-changing mechanisms of some type such as are shown in Fig. 8, which function to vary the effective number of turns of the windings connected in the regulating circuits to effect the degree and direction of both the voltage magnitude and phase-shift adjustment which may be required or desired. It will be appreciated, therefore, that the particular positions of these adjustable connections, which we have illustrated in Figs. 3 and 7, have been chosen only for the purpose of explaining the vector relation of the voltages which are involved in our scheme, and that the positions may be changed, at the will of an operator, to effect the adjustment required.

Each of the transformer windings 40, 41 and 42, which supply the in-phase components, and each of the quadrature-phase-component supply windings 43, 44 and 45, are provided with the tap changing equipment illustrated in Fig. 8. The three equipments for the windings named in the in-phase-component supply group are preferably arranged for simultaneous operation, as are likewise the three equipments associated with the windings of the quadrature-component group, the tap changes of one group, however, being independent of those of the other group.

As will be seen from Fig. 8, five taps are brought out from each winding and connected to a similar number of tap switches 81, 82, 83, 84 and 85, each of which is provided with the two cooperating contact members shown. An auto-transformer 86 is connected to contact members of adjacent pairs of the tap switches in the manner illustrated, its midpoint 87 constituting the connection from the switches to the external circuit. It will be observed that, to afford clearer explanation, winding 42 of transformer 36 and its external connections 72 and 73 have been shown with the tap-changing apparatus illustrated in this figure.

It will be noted, from examining the controller sequence chart at the left of Fig. 8, that nine tap connections may be made from the operation of the five switches. For example, in controller position 1, the conductor 88 is connected to the transformer winding 42 through the pair of switch contact members 81 and one-half of the preventive autotransformer winding 86. In controller position 2, both pairs of cooperating contact members 81 and 82 are closed, and conductor 73 has a potential equivalent to a point on the transformer winding midway between the taps connecting the contact members 81 and 82. In controller position 3, the contact members 81 are disengaged, and the conductor 73 is connected to the tap connection corresponding to the contact members 82. This sequence of operation continues throughout the range of control that is effective between the number of cooperating contact members and transformer taps.

Since we have provided, as before mentioned, means whereby the several switch groups 46, 47 and 48 are similarly operated, the connections of the conductors 62, 68 and 63 to the transformer windings 40, 41 and 42, respectively, will, at all times, correspond to each other, so that the voltage-magnitude components are adjusted in a similar manner for all three phases.

Likewise, the tap-changing equipments associated with windings 43, 44 and 45 are arranged to be operated simultaneously, the equipment for each winding, as mentioned, being identical with that described in connection with Fig. 8, a change in the position of tap connection 49, of Figs. 3 and 7, is always accompanied by a similar change in position of tap connections 50 and 51 to ensure that the phase-shifting component is also adjusted in a similar manner for all three phases of the power circuit.

It will be understood, however, that, should it be desirable, as might be the case in polyphase circuits in which the load is seriously unbalanced, our invention and its associated tap-changing control can be adapted to permit individual adjustment for any or all of the phases, in which case the parallel-operation feature of the groups of tap-changing equipments would be dispensed with.

For conditions in which the range of the voltage-magnitude-adjusting component need be but 58% of the phase-shifting component, and in which the maximum values of the two independent components are not simultaneously required, we have provided means whereby the three-winding regulating transformers of the system just explained may be replaced by two-winding transformers, thereby effecting a still further saving in the cost and weight of the complete equipment.

A system of this type is illustrated in Fig. 9 and comprises three series transformers 89, 90 and 91 placed in the lines 92, 93 and 94, respectively, of the three-phase power circuit to be regulated. Windings 95, 96 and 97 of the three regulating transformers may be connected, as in the previous case, in star relation for energization from the power circuit. The secondary windings 98, 99 and 100 are each provided with two sets of tap-changing equipment connected to the winding in the manner indicated in Fig. 10. Each of these equipments may be a duplicate of that described and explained in connection with Fig. 8 and hence operated in an identical manner.

Thus, for instance, the arrowed tap connections shown in Fig. 9 for winding 98, which we may designate by 101 and 102, comprise, as shown in Fig. 10, the tap-changing equipments shown, respectively, at the right and at the left of the transformer winding with which they are connected. Similar apparatus comprises tap connections 103 and 104 of winding 99 and the tap connections 105 and 106 of winding 100.

In operation, the tap-changing equipments 101, 103 and 105 are arranged for simultaneous tap changes, in a manner similar to that which has been previously explained with reference to the system of Figs. 3, 8 and 7, and the tap-changing equipments 102, 104 and 106 are likewise arranged for simultaneous operation, independent, of that of the first named group.

It will be observed from Fig. 9 that each of the series transformers 89, 90 and 91 is arranged for energization from connections with each of the secondary windings of the two regulating transformers which are energized from the two phases of the power circuit other than the one in the line of which that series transformer is located, and that the midpoints of these three regulating-transformer secondaries are joined through a common connection 107, whereby the series-transformer energizing circuits are completed.

The vector relations of the adjusting voltages for one phase of this system are illustrated in Fig. 11, in which vectors 95, 96 and 97 represent the supply-line voltages which energize the primary windings of the regulating transformers designated by like numbers. The series-transformer windings are represented also in this figure at 89, 90 and 91, combined, as they are with the vectors, for the purpose of explaining the system. The vectors of the voltage acting in the secodary windings 98, 99 and 100 are shown at the right of the figure and have been assigned the same numbers as the windings in which they act, the central intersecting point 107 denoting the common connection of the midtaps of the windings.

The energizing circuit for series transformer 89 is reproduced in this diagram to illustrate the manner in which the in-phase and the quadrature components of adjusting voltage are respectively obtained, the tap connections 101 and 104 being illustrated in contact with the vectors of the voltages by which series transformer 89 is energized.

In shifting the position of the tap connections 101 and 104, the arrows shown in Fig. 11 move in effect along the length of the vectors 100 and 99, respectively, and, in so doing, vary the values of both the in-phase and the quadrature components of the adjusting voltage. For the phase connection shown in Fig. 11, the horizontal distance between arrows 101 and 104 represents the quadrature component of the adjusting voltage, at an angle of 90° with vector 95, while the vertical distance between these two connections determines the in-phase component of voltage parallel to vector 95, applied to series transformer 89.

In the particular positions shown in the drawings, an appreciable value of quadrature component is impressed on the series transformer 89, and no in-phase component results from the combination. If, however, the tap connection 104 is moved downwardly to the left upon vector 99 to some position, such as shown by the dotted arrow, the in-phase component of regulating voltage will increase to the value indicated by the vertical distance separating tap connections 101 and 104 in the dotted position; at the same time, the quadrature component will have decreased to a low or zero value, as indicated by the small or negligable horizontal distance between the two tap connections in dotted position.

From the geometry of the figure comprising vectors 98, 99 and 100, it will be apparent that the maximum value of the in-phase regulating component bears a ratio to the maximum value of the quadrature-phase component of approximately 58%, and it will be further evident that both of these maximum values cannot be obtained at the same time. However, a wide range of intermediate values and combinations thereof is available through the use of this scheme, and, in certain applications in which its adequacy is sufficient to perform the adjusting requirement, its lower cost is of sufficient advantage to justify and make desirable its application.

It will thus be seen that, through our invention, we have provided schemes of combined voltage magnitude and phase-angle adjustment for alternating-current power circuits which utilize less equipment than any system heretofore devised and perform all of the required functions in a comparable, if not a superior, manner.

Although we have shown certain specific embodiments of our invention, we are fully aware that many modifications thereof are possible. Our invention, therefore, is not to be restricted except insofar as is necessitated by the prior art and by the spirit of the appended claims.

We claim as our invention:

1. In a polyphase electrical power circuit, a system for regulating the magnitude and phase position of the voltages between the input and the output sides of said circuit, said regulating system comprising, in combination, a two winding series transformer associated with each of the circuit conductors, one winding of each transformer being connected in circuit with the conductor, two sources of voltage connected in series circuit relation for energizing the other winding, the voltage of one source being in phase with the power voltage acting on the input side of the given circuit conductor, the voltage of second source bearing a substantially 90° phase relation thereto, and means for independently adjusting the values of said voltages to thereby control, respectively, the magnitude and phase position of the voltage in the output side of said power circuit.

2. In combination, two electrical power circuits, a series transformer comprising a primary winding and a secondary winding joining together conductively, through its secondary winding, each conductor of one power circuit with the corresponding conductor of the other power circuit, two sources of voltage connected in series circuit relation for energizing the said primary winding, the voltage of the first source being in phase with the power voltage acting on the given conductor in one power circuit, the voltage of the second source having substantially a 90° phase relation thereto, and means for independently adjusting the values of the voltages in said sources to thereby control the relative magnitudes and phase positions of the power voltage acting in the said two power circuits.

3. In a polyphase system, a power circuit, a series transformer connected in each line of the power circuit and a plurality of transformer units corresponding to the number of phases of the system, each transformer unit comprising one primary and two secondary windings in mutual inductive relation, means for connecting the primary windings of all the units for energization from the lines of the power circuit, a plurality of tap connections for each of both secondary windings of each unit, means for connecting the first secondary winding of each unit to the series transformer in the corresponding power-circuit phase line through the second secondary windings of the other units in series circuit therewith, and switching means for changing the tap connections to the said secondary windings of all units to vary the ratio and phase-angle relation between the power voltages acting in the primary windings of said units and the voltages impressed on the series transformers to correspondingly control the magnitudes and phase-angle positions of the voltages in the power circuit.

4. In a polyphase power circuit, a series transformer connected in each line of the circuit, and a regulating transformer system for energizing the series transformers, said system comprising a group of windings connected to the power circuit, and a second group of windings inductively related to the first group and connected to the series transformers, means for varying the voltage ratio between said groups of windings comprising tap-changing switches for the windings of one group, and means for introducing into the circuits connected with said series transformers voltages which are angularly displaced from the voltages of the second named group of windings, said means comprising auxiliary windings and tap-changing switches therefor, said auxiliary windings being inductively related to, and connected between windings of the said second named group.

5. A voltage-magnitude and phase-angle regulating system for polyphase power circuits comprising, in combination, a series transformer connected in each line of the power circuit, and a plurality of regulating transformer units corresponding to the number of phases of the system, each of said units comprising three inductively related windings, the first windings of all the units being interconnected and arranged for energization from the power circuit, a plurality of tap connections for the second and third windings of each unit, means for connecting the second winding of each unit to the series transformer in the corresponding phase line of the power circuit to supply an in-phase component of adjusting voltage thereto, said connecting means being completed through the third windings of the other units in combination to supply a phase-angle-displacement component of adjusting voltage, switching means for similarly changing the tap connections to the second windings of said units for varying the magnitude of the said in-phase component of voltage, and switching means for similarly changing the tap connections to the said third windings for varying the said phase-angle-displacement component of voltage.

6. In combination, a polyphase power circuit, a series transformer connected in each line thereof, a plurality of regulating transformer units corresponding to the number of phases of the system, each transformer unit comprising three inductively related windings, the first windings of the several units being interconnected and energized from the power circuit, means for varying the effective number of turns of said second and third windings of each unit without removing the load therefrom, and means for connecting the second winding of each unit to the series transformer in the conductor of the power circuit corresponding to the phase thereof through the third windings of the other units in series circuit combination, said second windings thereby supplying to the series transformers components of voltage in phase with, and for the purpose of adjusting, the magnitude of the power-circuit voltages, and said third windings similarly supplying components of voltage thereto which are out of phase with, and for the purpose of adjusting, the phase shift of the power-circuit voltage.

7. In a polyphase power circuit, a series transformer in each line of the circuit, and a regulating-transformer system for energizing the series transformers, said system comprising a group of primary windings connected to the power circuit, and a corresponding group of secondary windings inductively related to said primary windings, connected in series circuit relation to energize the series transformers, two independent sets of tap-changing switches associated with each of the secondary windings, means for joining together center taps of all of the secondary windings, and connections from one set of tap-changing switches of each of a pair of secondary windings corresponding to adjacent phases of the power circuit made to the series transformer in the power line of each of the remaining phase lines, the operation of the said independent sets of tap-changing switches thus acting to vary the magnitude and phase-angle components of the adjusting voltage applied to the series transformers.

8. In combination, a polyphase power circuit, a series transformer connected in each line thereof, a plurality of regulating-transformer units corresponding to the number of phases of the circuit, each transformer unit comprising two inductively related windings, the first windings of all units being interconnected and arranged for energization from the power circuit, the second windings of all units being joined together at their mid-points, each of said second windings being provided with two independent means for changing the taps for two separate connections without removing the load, one of said connections from each of a pair of windings corresponding to adjacent phases being made to the series transformer in the line of each of the remaining phases the operation of the said independent tap-changing means acting to vary the magnitude and phase angle components of the adjusting voltage thus applied to the series transformers.

In testimony whereof, we have hereunto subscribed our names this 13th day of January, 1931.

JAMES T. MERCEREAU.
HORACE LEE COLE.